United States Patent
Voorman et al.

(10) Patent No.: US 7,313,060 B2
(45) Date of Patent: Dec. 25, 2007

(54) OPTICAL DISK SYSTEM WITH NON-LINEARLY CONTROLLED AMPLIFIER

(75) Inventors: Johannes Otto Voorman, Geldrop (NL); Gerben Willem De Jong, Eindhoven (NL); Johannes Hubertus Antonius Brekelmans, Eindhoven (JP)

(73) Assignee: Koninklijke Philips Electronics, N.V., Eindhoven (NL)

( * ) Notice: Subject to any disclaimer, the term of this patent is extended or adjusted under 35 U.S.C. 154(b) by 44 days.

(21) Appl. No.: 10/523,386

(22) PCT Filed: Jul. 21, 2003

(86) PCT No.: PCT/IB03/03288

§ 371 (c)(1),
(2), (4) Date: Feb. 1, 2005

(87) PCT Pub. No.: WO2004/015697

PCT Pub. Date: Feb. 19, 2004

(65) Prior Publication Data

US 2005/0265149 A1    Dec. 1, 2005

(30) Foreign Application Priority Data

Aug. 6, 2002    (EP) ................... 02078240

(51) Int. Cl.
*G11B 7/00*    (2006.01)

(52) U.S. Cl. .................... 369/44.36; 369/124.1

(58) Field of Classification Search ............... None
See application file for complete search history.

(56) References Cited

U.S. PATENT DOCUMENTS

| | | | | |
|---|---|---|---|---|
| 4,998,234 A | * | 3/1991 | Rees et al. ............... | 369/44.27 |
| 5,258,968 A | * | 11/1993 | Matsuda et al. .......... | 369/44.35 |
| 5,291,466 A | * | 3/1994 | Kwak ....................... | 369/44.35 |
| 6,236,632 B1 | * | 5/2001 | Hayashi .................. | 369/59.16 |
| 6,690,232 B2 | * | 2/2004 | Ueno et al. ................ | 330/85 |

FOREIGN PATENT DOCUMENTS

| | | |
|---|---|---|
| JP | 04355999 | 12/1992 |
| JP | 06187643 | 7/1994 |
| JP | 06187733 | 7/1994 |

* cited by examiner

*Primary Examiner*—William R. Korzuch
*Assistant Examiner*—Christopher Lamb

(57) ABSTRACT

An optical disk system includes at least one photo detector connected with a variable gain amplifier, a slicer, and a generator which is in the feedback path between the slicer and amplifier. A differential time delay detector provides the output of the optical disk system. The generator is configured for controlling the amplifier non-linearly so that time constants of the control loop of the amplifier which depend upon the level of the input signals are compensated and the timing behavior of the control loop of the amplifier has a more continuous character. A capacitor forms part of an integrator for making the mean value of the output voltage signal of the slicer equal to zero.

18 Claims, 3 Drawing Sheets

OPTICAL DISK SYSTEM WITH NON-LINEARLY CONTROLLED AMPLIFIER

Figure 1:
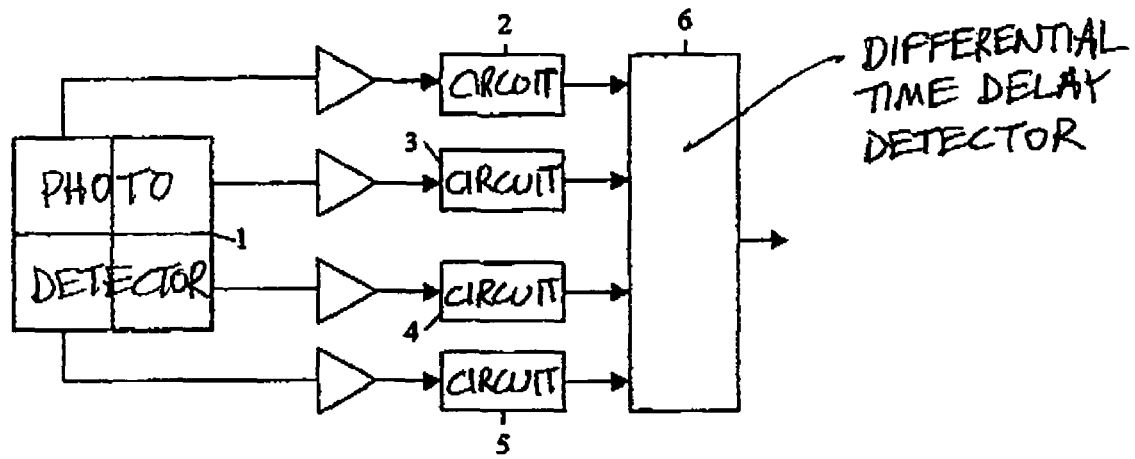

The invention relates to an optical disk system comprising at least one photo detector for detecting at least a part of said optical disk and in response generating detection signals and comprising at least one variable gain amplifier for amplifying detection signals and comprising at least one slicer for slicing amplified detection signals.

The invention also relates to a circuit for amplying and slicing detection signals originating from at least one photo detector in an optical disk system and comprising at least one variable gain amplifier for amplifying detection signals and comprising at least one slicer for slicing amplified detection signals, and to a method for use in an optical disk system and comprising the steps of detecting at least a part of said optical disk via at least one photo detector and in response generating detection signals and amplifying detection signals via at least one variable gain amplifier and slicing amplified detection signals via at least one slicer.

Such an optical disk system is for example a Compact Disk system or CD system for playing CDs and/or recording CDs or is for example a Digital Versatile Disk system or DVD system for playing DVDs and/or recording DVDs and/or is for example a Blu-ray Disk system or BD system etc.

A prior art optical disk system is known from a Japanese patent application published under publication number 06-187733 and filed under application number 04-355999, which discloses a programmable gain amplifier (variable gain amplifier) for amplifying magneto-optical signals (detection signals) and a comparator (slicer) for slicing amplified detection signals.

Said slicer is usually followed by a differential time delay detector. To avoid delay differences caused by path length differences (of transmission lines between photo detector and differential time delay detector), it is desirable to integrate said differential time delay detector together with said amplifier and said slicer all on the photo detector integrated-circuit. Said variable gain amplifier then keeps the levels of the amplified detection signals invariant, even for detection signals having non-invariant levels. As a result, slicer-delays will be constant and will not change with varying levels of the detection signals. The control loop of said variable gain amplifier however will have variable time constants depending upon the levels of the detection signals, and these variable time constants are disadvantageous.

It is an object of the invention, inter alia, of providing an optical disk system as defined in the preamble in which the time constants of said control loop of said variable gain amplifier are less varying.

The optical disk system according to the invention is characterized in that said optical disk system comprises at least one generator in a feedback path between said slicer and said variable gain amplifier for controlling said variable gain amplifier non-linearly.

By introducing said generator in a feedback path between said slicer and said variable gain amplifier, said variable gain amplifier is controlled non-linearly, like for example exponentially etc. Then the gain of said variable gain amplifier is an exponential function of a generator signal, and as a result the time constants of said control loop of said variable gain amplifier although depending upon the levels of the detection signals are now compensated in such a way that the timing behavior of the control loop of the variable gain amplifier has got a more stable character.

The invention is based upon an insight, inter alia, that for compensating linear processes a linear control should be used and for compensating non-linear processes a non-linear control should be used, and is based upon a basic idea, inter alia, that said generator should be introduced for controlling said variable gain amplifier non-linearly.

The invention solves the problem, inter alia, of providing an optical disk system in which fluctuations in the time constants of the control loop of said variable gain amplifier are compensated or in other words in which the timing behavior of the control loop of the variable gain amplifier has got a more stable character, and is advantageous, inter alia, in that said variable gain amplifier and slicer can be integrated on the photo detector integrated-circuit.

A first embodiment of the optical disk system is advantageous in that the generator comprises a converter for converting voltages into currents.

By introducing said converter for receiving an input voltage signal from the output of said slicer and for in response to said input voltage signal generating (non-linearly) an output current signal and for supplying said output current signal to an input of said variable gain amplifier, said generator is of low complexity and easy to integrate.

A second embodiment of the optical disk system is advantageous in that the generator comprises a further converter for converting voltages into currents and comprises at least one capacitor located between both converters.

By introducing said further converter, one of said converters coupled to the output of said slicer together with said capacitor forms an integrator for making the mean value of the output voltage signal of said slicer equal to zero. This improves the performance of said slicer. The other converter coupled to the input of said variable gain amplifier takes care of said non-linear control of said variable gain amplifier. The gain of said variable gain amplifier is now an exponential function of a voltage drop across said capacitor, and as a result the time constants of said control loop of said variable gain amplifier are now well compensated in such a way that the timing behavior of the control loop of the variable gain amplifier has got a very stable character.

A third embodiment of the optical disk system is advantageous in that the photo detector comprises at least four subdetectors, with the optical disk system comprising, per subdetector, a variable gain amplifier, a slicer and two converters with a capacitor therebetween.

By introducing per subdetector a variable gain amplifier, a slicer and two converters with a capacitor, with four subdetectors (like four quadrants) together forming said photo detector, one photo detector integrated-circuit further comprising at least one differential time delay detector can take care of the generation of the radial tracking error.

Embodiments of the circuit according to the invention and of the method according to the invention correspond with the embodiments of the optical disk system according to the invention.

These and other aspects of the invention will be apparent from and elucidated with reference to the embodiments(s) described hereinafter.

Figure 2:
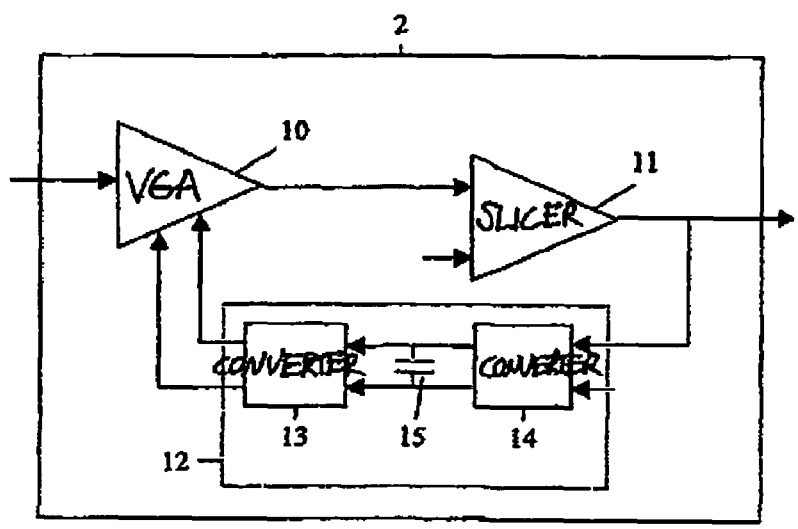
Figure 3:
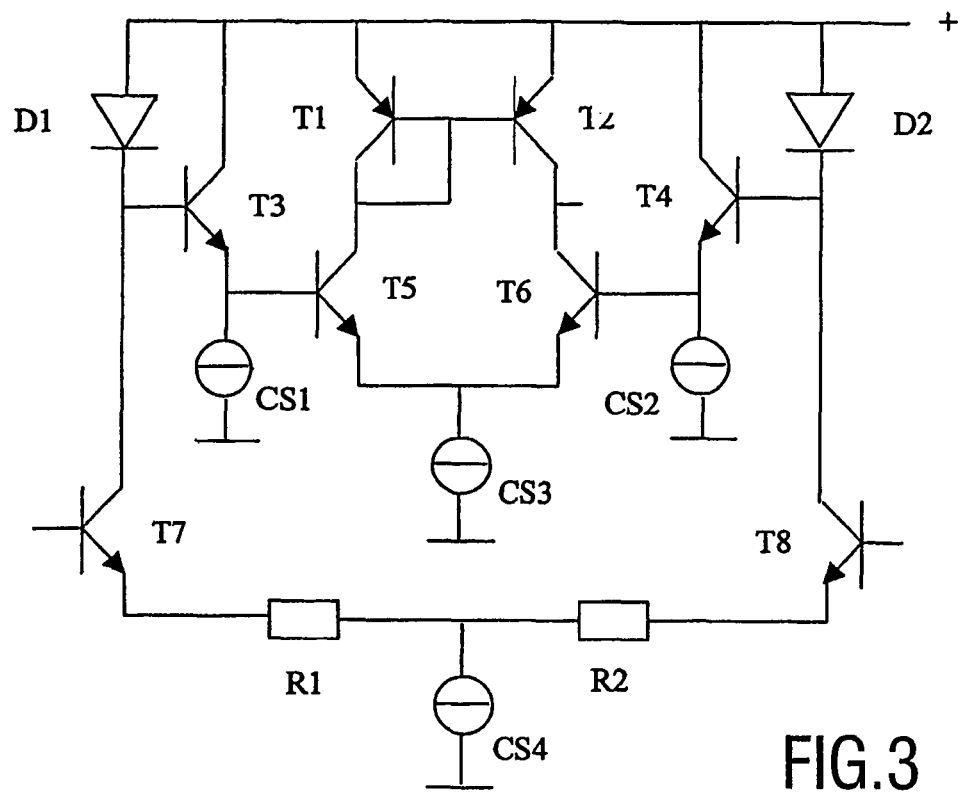
Figure 4:
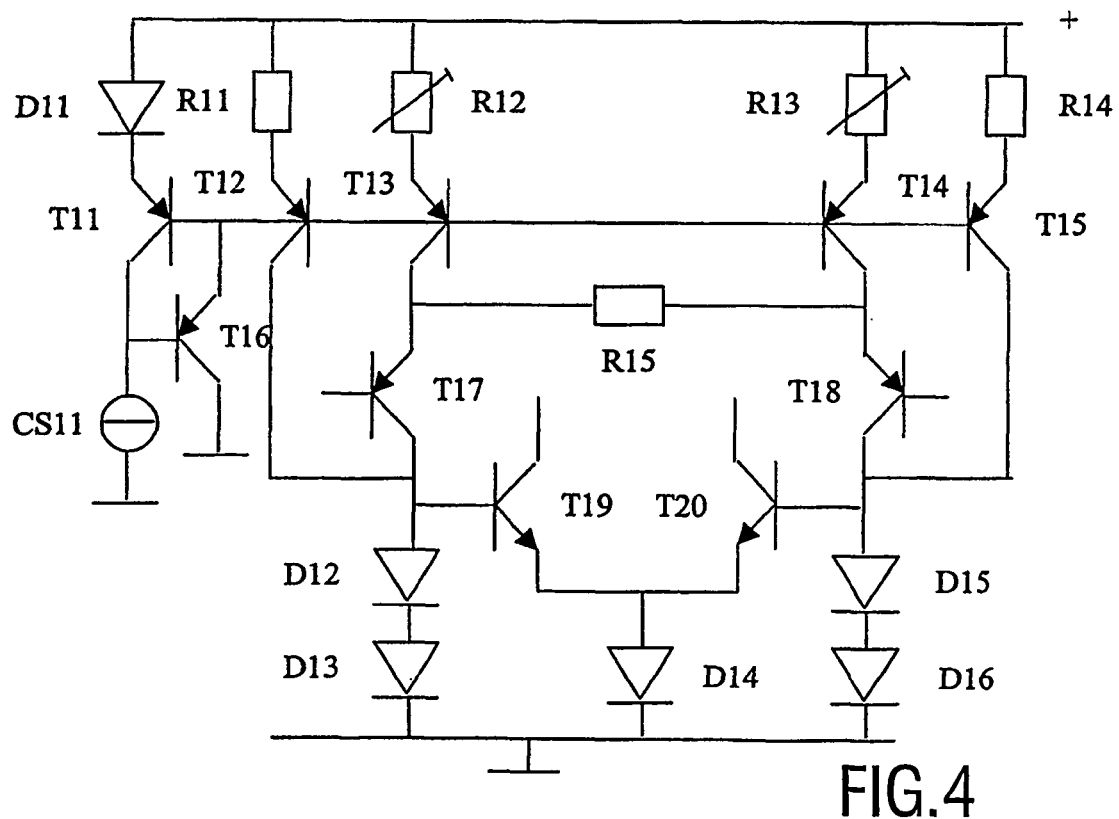
Figure 5:
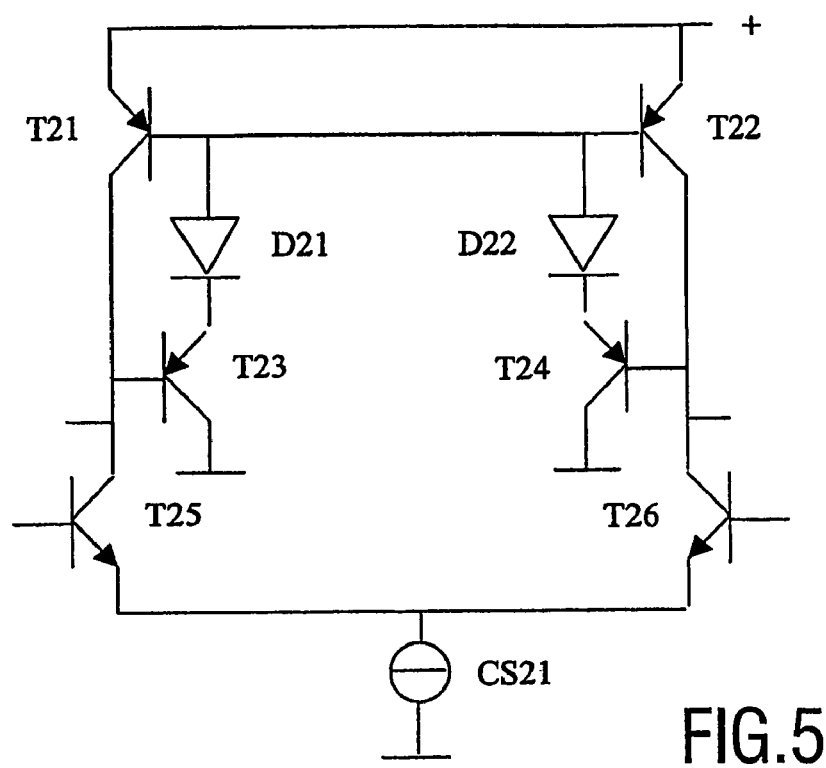
Figure 6:
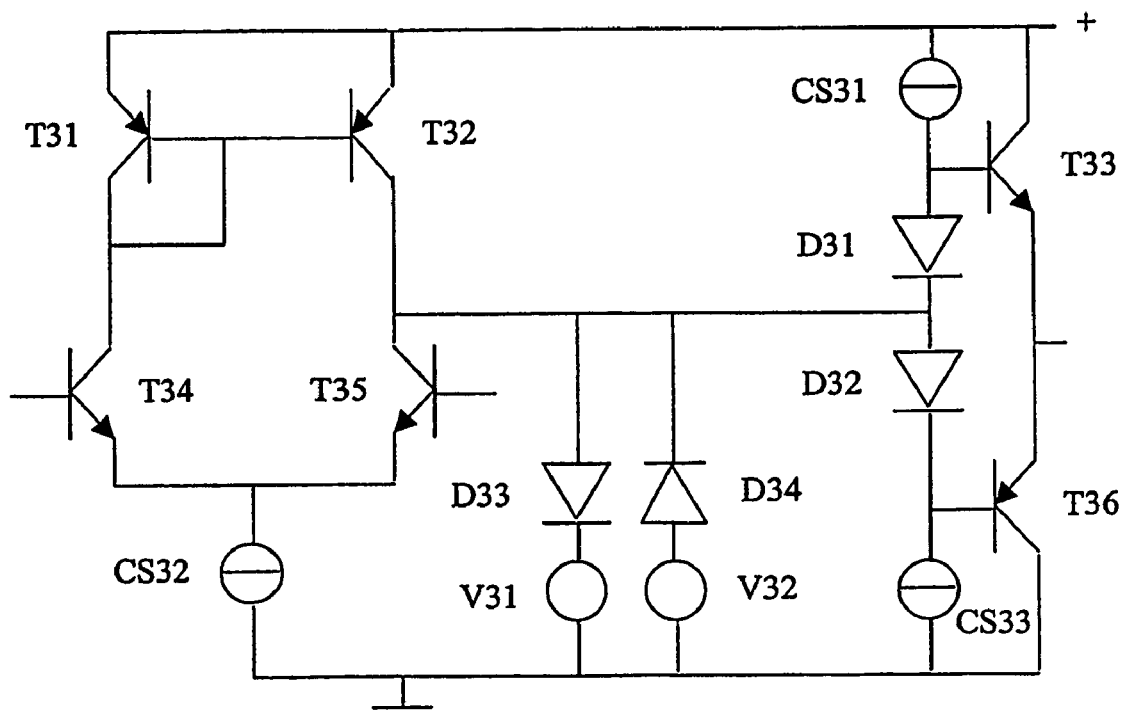

FIG. 1 illustrates in block diagram form an optical disk system according to the invention comprising a circuit according to the invention, FIG. 2 illustrates in block diagram form a circuit according to the invention comprising a variable gain amplifier and a slicer and a generator, FIG. 3 discloses an embodiment of a variable gain amplifier, FIG. 4 discloses an embodiment of a converter (a non-linear voltage-to-current converter), FIG. 5 discloses an embodiment of a further converter (a voltage-to-current converter), and FIG. 6 discloses an embodiment of a slicer.

The optical disk system disclosed in FIG. 1 comprises a photo detector 1 comprising four subdetectors each one being coupled via a pre-amplifier to a circuit 2,3,4,5. Outputs of circuits 2,3,4,5 are coupled to inputs of a differential time delay detector 6.

Circuit 2 shown in FIG. 2 comprises a variable gain amplifier 10 or VGA 10 of which an input forms the input of circuit 2 and of which an output is coupled to a first input of a slicer 11. A second input of slicer 11 is coupled to a reference source and an output of slicer 11 forms the output of circuit 2 and is coupled to an input of a generator 12, of which outputs are coupled to control inputs of said VGA 10.

Said generator 12 comprises a converter 13 of which the outputs form the outputs of generator 12 and of which the inputs are coupled to the outputs of a further converter 14 with a capacitor 15 being in between parallelly. A first input of further converter 14 forms said input of generator 12 and a second input is coupled to a reference source.

The invention as shown in FIGS. 1 and 2 functions as follows. Photo detector 1 detects a part of an optical disk and in response generates detection signals which via said pre-amplifier and VGA 10 are amplified. VGA 10 thereby keeps the levels of the amplified detection signals invariant, even for detection signals having non-invariant levels. As a result, slicer-delays will be constant and will not change with varying levels of the detection signals. Slicer 11 slices the amplified detection signals, after which differential time delay detector 6 detects any time delays. To avoid delay differences caused by path length differences (of transmission lines between photo detector 1 and differential time delay detector 6), it is desirable to integrate differential time delay detector 6 together with VGA 10 and slicer 11 all on the same photo detector integrated-circuit.

By providing circuit 2,3,4,5 with generator 12 in a feed-back path between slicer 11 and VGA 10, VGA 10 is controlled non-linearly, like for example exponentially etc. Then the gain of VGA 10 is an exponential function of the voltage drop across capacitor 15, and as a result the time constants of the control loop of VGA 10 although depending upon the levels of the detection signals are now compensated in such a way that the timing behavior of the control loop of VGA 10 gets a more stable character. This exponential control is explained more detailledly at the hand of FIGS. 3 and 4.

Generator 12 comprises converter 13 for converting voltages into currents, which converter 13 introduces the non-linear control of VGA 10. This non-linear control is explained more detailledly at the hand of FIGS. 3 and 4. Generator 12 further comprises further converter 14 for converting voltages into currents with a capacitor 15 being located between both converters 13,14. This further converter 14 together with said capacitor 15 forms an integrator for making the mean value of the output voltage signal of slicer 11 equal to zero. This improves the performance of said slicer 11. Said generator 12 comprising both converters 13,14 is of low complexity and easy to integrate.

The invention is based upon an insight, inter alia, that for compensating linear processes a linear control should be used and for compensating non-linear processes a non-linear control should be used, and is based upon a basic idea, inter alia, that generator 12 should be introduced for controlling VGA 10 non-linearly.

The invention solves the problem, inter alia, of providing an optical disk system in which fluctuations in the time constants of the control loop of VGA 10 are compensated or in other words in which the timing behavior of the control loop of VGA 10 has got a more stable character, and is advantageous, inter alia, in that VGA 10 and slicer 11 can be integrated on the photo detector integrated-circuit, together with said differential time delay detector 6.

VGA 10 shown in FIG. 3 comprises eight transistors T1-T8, two diodes D1-D2, four current sources CS1-CS4 and two resistors R1-R2 all coupled as disclosed.

Converter 13 shown in FIG. 4 comprises ten transistors T11-T20, six diodes D11-D16, one current source CS11 and five resistors R11-R15 all coupled as disclosed.

VGA 10 as shown in FIG. 3 function as follows. Through each diode D1,D2 a current flows equal to I, current source CS4 generates a current equal to 2I, and current source CS3 generates a current 2J. Then the voltage gain of this VGA 10 is equal to Vout/Vin=J/I•Rout/Rin, with Vout being the voltage between the collector of TE and ground, with yin being the voltage between the bases of T7 and T8, with Rout being the input resistance (or an input resistor) of slicer 11 and with Rin being equal to R1 or R2.

Converter 13 as shown in FIG. 4 functions as follows. The bases of transistors T17 and T18 are coupled to the outputs of further converter 14. Transistors T17, T18 and R15 can be considered to be a transconductance amplifier for converting the voltage across capacitor 15 into a current X•d=0.2 . . . −0.2 mA. Through each transistor T12, T13, T14, T15 a current flows of for example 0.2 mA. Then through transistor T17 a current flows of 0 . . . 0.4 mA, and through transistor T18 a current flows of 0.4 . . . 0 mA. Through transistor T19 a current flows equal to 2I, and through transistor T20 a current flows equal to 2J (see VGA 10 in FIG. 3). Through each one of the diodes D12,D13 a current flows of X•(1−d) 0.2 . . . 0.6 mA, and through each one of the diodes D15, D16 a current flows of X•(1−d) 0.6. . . 0.2 mA. With 0.2 mA<X•(1−d)<0.6 mA, it can be found that 0.5<d<0.5 and X=0.4 mA, and by solving the mesh equation that $J/I = [(1+d)/(1-d)]^2$.

When combining said J/I equation with said voltage gain Vout/Vin, it becomes clear that said voltage gain equation is generally a function of or more specifically proportional with $[(1+d)/(1-d)]^2$ which is a second order approximation of the desired exponential control.

Further converter 14 shown in FIG. 5 comprises six transistors T21-T26, two diodes D21-D22 and a current source CS21 all coupled as disclosed. The bases of T25 and T26 form the inputs of further converter 14, and the collector of T25 and the collector of T26 form the outputs of further converter 14.

Slicer 11 shown in FIG. 6 comprises six transistors T31-T36, four diodes D31-D34, three current sources CS31-CS33 and two voltage sources V31-V32 all coupled as disclosed. The bases of T34 and T35 form the inputs of slicer 11 and the emitter of T33 (or of T36) forms the output of slicer 11.

FIGS. 1-6 just show possible embodiments, and other embodiments are possible without departing from the scope of this invention. Instead of bipolar transistors, other transistors could be used like for example JFETs and MOSFETs. Said non-linear control may be an exponential control, in other words the gain of VGA 10 may exponentially depend upon the voltage drop across capacitor 15, but as calculated above, other non-linear controls are not to be excluded like for example (second order) approximations of said exponential control like said quadratic function.

Photo detector 1 may comprise any number of subdetectors like for example two, four or six or more subdetectors, said pre-amplifiers may be integrated with said subdetectors or with said circuits 2-5 or may be left out. Differential time delay detector 6 may comprise any number of latches like for example two, four or eight or more latches plus one or more adders/subtracters and one or more low pass filters. VGA 10 and slicer 11 may be coupled directly or via other elements, and generator 12 may comprise further elements in addition to said converters 13, 14 and said capacitor 15.

Summarizing, optical disk systems comprising photo detectors 1 with variable gain amplifiers 10 and slicers 11 are provided with generators 12 in feedback paths between slicer 11 and amplifier 10 for controlling said amplifier 10 non-linearly. As a result, time constants of the control loop of said amplifier 10 which depend upon the level of the input signals are now compensated and the timing behavior of the control loop of said amplifier 10 has got a more stable character. Said generator 12 comprises a converter 13 and is of low complexity and easy to integrate on a photo detector integrated-circuit together with said amplifier 10 and slicer 11 followed by a differential time delay detector 6. Said generator 12 further comprises a further converter 14 with a capacitor 15 forming an integrator for making the mean value of the output voltage signal of said slicer 11 equal to zero.

The invention claimed is:

1. An optical disk system comprising:
   at least one photo detector for detecting at least a part of said optical disk and in response generating detection signals;
   at least one variable gain amplifier for amplifying detection signals and forming amplified detection signals;
   at least one slicer for slicing the amplified detection signals to form a sliced output by comparing the amplified detection signals with a reference signal;
   at least one generator in a feedback path between said at least one slicer and said at least one variable gain amplifier for controlling said at least one variable gain amplifier non-linearly; wherein said at least one generator comprises two converters interconnected with two connections, and at least one capacitor connected between the two connections; and
   a differential time delay detector configured to receive the sliced output and a further signal and to detect any time delay between the sliced output and the further signal.

2. The optical disk system of claim 1, wherein said at least one photo detector comprises at least four subdetectors, with said optical disk system comprising, per subdetector a variable gain amplifier, a slicer and two converters with a capacitor.

3. The optical disk system of claim 1, wherein said differential time delay detector includes latches, an adder or a subtracter, and a low pass filter.

4. An optical disk system comprising:
   at least one photo detector for detecting at least a part of said optical disk and in response generating detection signals;
   at least one variable gain amplifier for amplifying the detection signals and forming amplified detection signals;
   at least one slicer for slicing the amplified detection signals to form a sliced output by comparing the amplified detection signals with a reference signal;
   at least one generator in a feedback path between said at least one slicer and said at least one variable gain amplifier for controlling said at least one variable gain amplifier non-linearly;
   wherein said at least one photo detector comprises at least four subdetectors, with said optical disk system comprising per subdetector a variable gain amplifier, a slicer and two converters with a capacitor; and
   a differential time delay detector configured to receive the sliced output and a further signal and to detect any time delay between the sliced output and the further signal.

5. The optical disk system of claim 4, wherein said two converters are interconnected with two connections, and said capacitor is connected between the two connections.

6. The optical disk system of claim 4, wherein said differential time delay detector includes latches, an adder or a subtracter, and a low pass filter.

7. A circuit for amplifying and slicing detection signals originating from at least one photo detector in an optical disk system and comprising:
   at least one variable gain amplifier for amplifying detection signals and forming amplified detection signals;
   at least one slicer for slicing the amplified detection signals to form a sliced output by comparing the amplified detection signals with a reference signal;
   at least one generator in a feedback path between said at least one slicer and said at least one variable gain amplifier for controlling said at least one variable gain amplifier non-linearly; and
   a differential time delay detector configured to receive the sliced output and a further signal and to detect any time delay between the sliced output and the further signal;
   wherein said at least one generator comprises two converters interconnected with two connections, and at least one capacitor connected between the two connections.

8. The circuit of claim 7, wherein said at least one photo detector comprises at least four subdetectors, with said optical disk system comprising, per subdetector a variable gain amplifier, a slicer and two converters with a capacitor.

9. The circuit of claim 8, wherein said two converters are interconnected with two connections, and said capacitor is connected between the two connections.

10. The circuit of claim 8, wherein said two converters are configured to convert voltages into currents.

11. The circuit of claim 7, wherein said differential time delay detector includes latches, an adder or a subtracter, and a low pass filter.

12. A method for use in an optical disk system and comprising the acts of:
   detecting at least a part of said optical disk via at least one photo detector and in response generating detection signals;
   amplifying the detection signals via at least one variable gain amplifier to form amplified detection signals;
   slicing the amplified detection signals via at least one slicer to form a sliced output by comparing the amplified detection signals with a reference signal;
   controlling said at least one variable gain amplifier non-linearly via at least one generator located in a feedback path between said at least one slicer and said at least one variable gain amplifier; and
   detecting any time delay between the sliced output and a further signal of a differential time delay detector;

wherein said at least one generator comprises two converters interconnected with two connections, and at least one capacitor connected between the two connections.

13. The method of claim 12, wherein said at least one photo detector comprises at least four subdetectors, with said optical disk system comprising, per subdetector a variable gain amplifier, a slicer and two converters with a capacitor.

14. The method of claim 13, wherein said two converters are interconnected with two connections, and said capacitor is connected between the two connections.

15. The method of claim 13, wherein said two converters are configured to convert voltages into currents.

16. The method of claim 12, wherein said differential time delay detector includes a latch, an adder or a subtracter, and a low pass filter.

17. A circuit for amplifying and slicing detection signals originating from at least one photo detector in an optical disk system and comprising:
    at least one variable gain amplifier for amplifying the detection signals and forming amplified detection signals;
    at least one slicer for slicing the amplified detection signals to form a sliced output by comparing the amplified detection signals with a reference signal;
    at least one generator in a feedback path between said at least one slicer and said at least one variable gain amplifier for controlling said at least one variable gain amplifier non-linearly; and
    a differential time delay detector configured to receive the sliced output and a further signal and to detect any time delay between the sliced output and the further signal;
    wherein said at least one photo detector comprises at least four subdetectors, with said optical disk system comprising per subdetector a variable gain amplifier, a slicer and two converters with a capacitor.

18. A method for use in an optical disk system and comprising the acts of:
    detecting at least a part of said optical disk via at least one photo detector and in response generating detection signals;
    amplifying the detection signals via at least one variable gain amplifier to form amplified detection signals;
    slicing the amplified detection signals via at least one slicer to form a sliced output by comparing the amplified detection signals with a reference signal;
    controlling said at least one variable gain amplifier non-linearly via at least one generator located in a feedback path between said at least one slicer and said at least one variable gain amplifier; and
    detecting any time delay between the sliced output and a further signal of a differential time delay detector;
    wherein said at least one photo detector comprises at least four subdetectors, with said optical disk system comprising per subdetector a variable gain amplifier, a slicer and two converters with a capacitor.

* * * * *